(12) United States Patent
Hodge

(10) Patent No.: US 9,816,561 B2
(45) Date of Patent: Nov. 14, 2017

(54) BEARING ASSEMBLY HAVING SPLINE CUTTING INNER RACE

(71) Applicant: Schaeffler Technologies AG & Co. KG, Herzogenaurach (DE)

(72) Inventor: Michael Hodge, Creston, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 32 days.

(21) Appl. No.: 14/803,283

(22) Filed: Jul. 20, 2015

(65) Prior Publication Data

US 2016/0025143 A1 Jan. 28, 2016

Related U.S. Application Data

(60) Provisional application No. 62/027,998, filed on Jul. 23, 2014.

(51) Int. Cl.
| | |
|---|---|
| *F16C 35/063* | (2006.01) |
| *F16D 1/072* | (2006.01) |
| *F16C 3/02* | (2006.01) |
| *F16C 19/48* | (2006.01) |

(52) U.S. Cl.
CPC ............ *F16C 35/0635* (2013.01); *F16C 3/02* (2013.01); *F16C 35/063* (2013.01); *F16D 1/072* (2013.01); *F16C 19/48* (2013.01); *F16C 2226/80* (2013.01); *F16C 2361/43* (2013.01); *Y10T 29/49908* (2015.01); *Y10T 403/4966* (2015.01)

(58) Field of Classification Search
CPC .......... F16C 3/02; F16C 19/48; F16C 35/063; F16C 35/0635; F16C 2226/80; F16C 2361/43; F16D 1/072; F16D 2001/103; Y10T 29/49636; Y10T 29/49647; Y10T 29/49908; Y10T 403/49; Y10T 403/4966; Y10T 403/4974
USPC .... 403/274, 282, 283; 29/505, 898, 898.048
See application file for complete search history.

(56) References Cited

U.S. PATENT DOCUMENTS

| | | | | |
|---|---|---|---|---|
| 2,279,955 | A * | 4/1942 | Sipe | F16D 1/072 403/277 |
| 5,716,156 | A * | 2/1998 | Bayer | F16D 1/072 403/282 |
| 5,829,135 | A * | 11/1998 | Koneda | F16D 1/072 29/525 |
| 7,387,462 | B2 * | 6/2008 | Hacker | F16D 1/072 403/359.1 |
| 8,128,504 | B2 * | 3/2012 | Fukumura | F16D 1/072 403/282 |

(Continued)

*Primary Examiner* — Josh Skroupa
(74) *Attorney, Agent, or Firm* — Davidson, Davidson & Kappel, LLC

(57) ABSTRACT

A bearing assembly for a motor vehicle drive train includes rolling elements, an outer race supporting the rolling elements, and an inner race rotatably supported by the rolling elements. The inner race includes a radially inner surface having a plurality of axially extending splines. The radially inner surface includes a primary chip groove formed therein that is defined by a primary cutting edge for spline cutting a mating shaft inserted into the radially inner surface. The radially inner surface further includes a secondary chip groove formed therein axially offset from the primary chip groove that is defined by a second cutting edge for spline cutting the shaft inserted into the radially inner surface.

20 Claims, 3 Drawing Sheets

(56) References Cited

U.S. PATENT DOCUMENTS

| | | | | |
|---|---|---|---|---|
| 8,584,369 B2* | 11/2013 | Meyer | .................. | F16C 3/02 |
| | | | | 33/1 PT |
| 9,435,381 B2* | 9/2016 | Larson | .................. | F16D 1/072 |
| 2001/0000285 A1* | 4/2001 | Tanaka | .................. | F16H 55/36 |
| | | | | 384/548 |

* cited by examiner

BEARING ASSEMBLY HAVING SPLINE CUTTING INNER RACE

This claims the benefit to U.S. Provisional Patent Application No. 62/027,998 filed on Jul. 23, 2014, which is hereby incorporated by reference herein.

The present disclosure relates generally to bearing assemblies and more specifically to bearing assemblies having spline cutting inner races.

BACKGROUND

Hubs with a single conventional spline cutting edge are known. Broaching tools are also used to cut splines, but such splines are not expected to meet performance criteria of a finished part.

SUMMARY OF THE INVENTION

In applications where a spline connection needs to transfer large amounts of torque, the spline generally has a higher length-to-diameter ratio. A high length-to-diameter ratio may cause material to form into a major diameter of the spline, which then causes the part to expand, and creates extremely high installation forces. This growth in diameter is problematic for a needle bearing and roller one way clutch as they need a high degree of precision for proper function and durability. Also, due to the expansion of the inner race, very high internal stresses are present.

A bearing assembly for a motor vehicle drive train is provided. The bearing assembly includes rolling elements, an outer race supporting the rolling elements, and an inner race rotatably supported by the rolling elements. The inner race includes a radially inner surface having a plurality of axially extending splines. The radially inner surface includes a primary chip groove formed therein that is defined by a primary cutting edge for spline cutting a mating shaft inserted into the radially inner surface. The radially inner surface further includes a secondary chip groove formed therein axially offset from the primary chip groove that is defined by a second cutting edge for spline cutting the shaft inserted into the radially inner surface.

A rotatable component for a motor vehicle drive train is also provided. The rotatable component includes a hollow shaft including a radially inner surface having a plurality of first axially extending splines. The radially inner surface includes a primary chip groove formed therein that is defined by a primary cutting edge. The radially inner surface further includes a secondary chip groove formed therein axially offset from the primary chip groove that is defined by a second cutting edge.

A method of forming a bearing assembly for a motor vehicle drive train is also provided. The method includes providing an inner race including a radially inner surface including a plurality of axially extending splines; forming a primary annular chip groove in the radially inner surface that is defined by a primary cutting edge; forming a secondary annular chip groove in the radially inner surface that is defined by a secondary cutting edge, the secondary chip groove being axially offset from the primary chip groove; and providing the inner race radially inside of rolling elements.

BRIEF DESCRIPTION OF THE DRAWINGS

The present invention is described below by reference to the following drawings, in which.

DETAILED DESCRIPTION

The present disclosure provides a cutting spline used to install a race for a one-way clutch onto a shaft. A chip groove is used to collect chips when the spline is cut for easier assembly. In this case, in order to prevent an initial cutting portion of the race from deflecting radially when a mating shaft is inserted into the inner race, a section of spline after the chip groove is used a second spline cutting edge. The radial section of the inner race is also thicker at the spline cutting edges, so there is less radial deflection of the inner race when the shaft is inserted. A second chip groove is added at a position axially offset from the first chip groove to collect chips from the second spline cutting edge, greatly reducing the shaft installation force.

Figure 1:
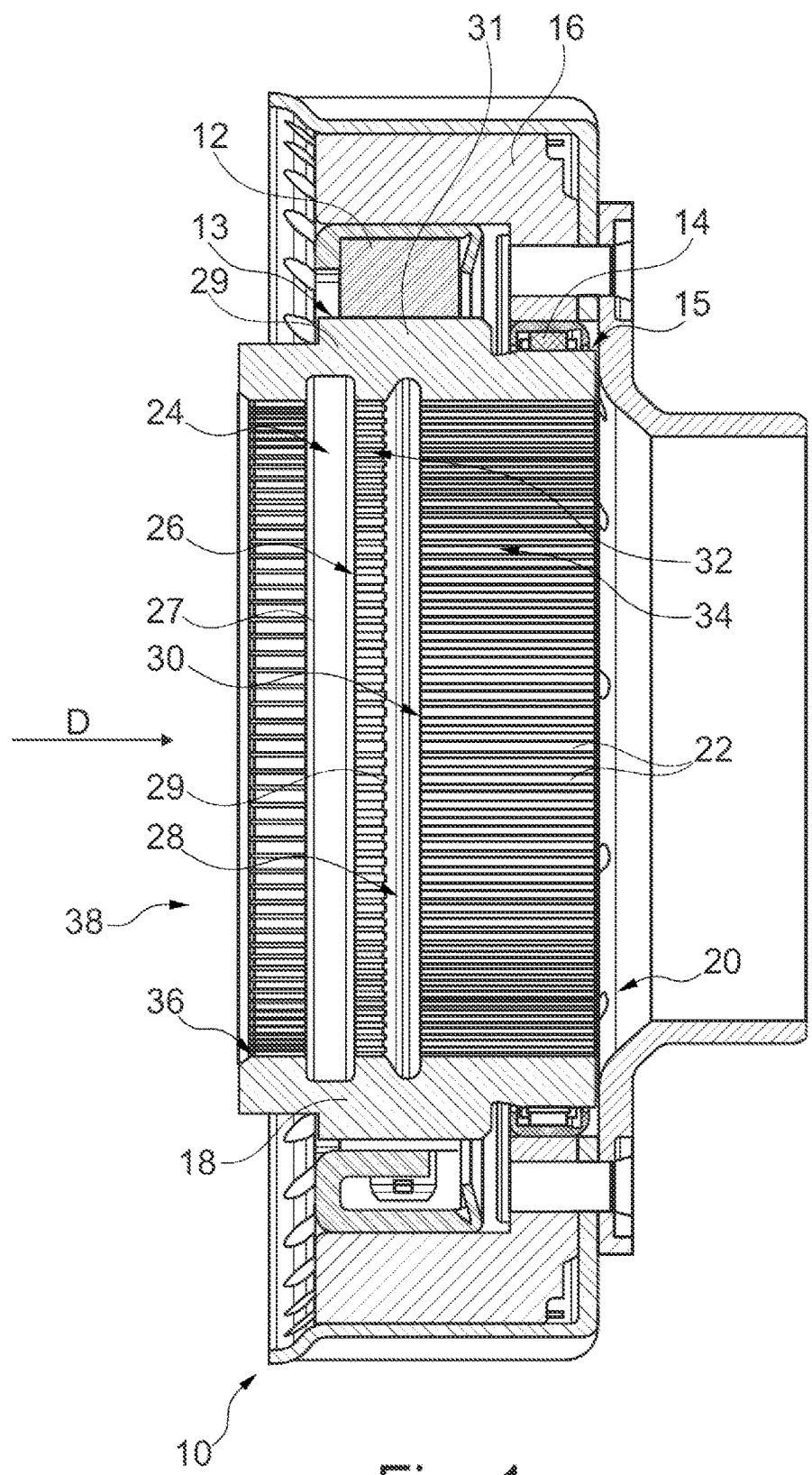
FIG. 1 shows a bearing assembly in accordance with an embodiment of the present invention.

FIG. 1 shows a bearing assembly 10 for a motor vehicle drive train in accordance with an embodiment of the present invention. In this embodiment, bearing assembly 10 is a roller one way clutch and needle bearing. Bearing assembly 10 includes rolling elements including a first set of rolling elements 12 and a second set of rolling elements 14 that are radially offset from, axially offset from, and smaller than the first set of rolling elements 12. An outer race 16 supports both sets of rolling elements 12, 14. An inner race 18 is a rotatable hollow shaft rotatably supported by rolling elements 12, 14. First rolling elements 12 contact a one way clutch bearing outer surface 13 of inner race 18 and second rolling elements 14 contact a needle bearing surface 15 of inner race 18. One way clutch bearing outer surface 13 is formed on a thicker portion of inner race 18 than needle bearing surface 15 and is positioned a greater distance radially from a center axis of inner race 18 than needle bearing surface 15. Inner race 18 includes a radially inner surface 20 including a plurality of axially extending splines 22. Radially inner surface 20 also includes a primary annular chip groove 24 formed therein that is defined by a primary cutting edge 26 for spline cutting a mating shaft inserted into radially inner surface 20.

Radially inner surface 20 further includes a secondary annular chip groove 28 formed therein axially offset from primary chip groove 24. Secondary chip groove 28 is defined by a secondary cutting edge 30 for spline cutting the shaft inserted into radially inner surface. Second cutting edge 30 may clean up the material that is formed into the major diameter of splines 22, which relieves pressure and alleviates the growth problem for inner race 18 while still providing a proper torque transfer connection between inner race 18 and the mating shaft. Secondary chip groove 28 provides the cleaned up material with a place to be collected and contained. An increased thickness of inner race 18 in the areas adjacent to cutting edges 26, 30 following the cutting movement of the mating shaft is designed to decrease the radial deflection of inner race 18 when the mating shaft is inserted.

Splines 22 are formed on a first splined portion 32 axially between primary chip groove 24 and secondary chip groove 28 on a first axial side of secondary chip groove 28 and on a second splined portion 34 on a second axial side of secondary chip groove 28 opposite the first axial side. Secondary annular chip groove 28 is also defined by a further edge 29 formed at the end of first splined portion 30. Splined portions 32, 34 have the same diameters and the same spline alignment as each other.

Radially inner surface 20 also includes pilot portion 36, which has a greater innermost diameter than first splined portion 34 so as to allow the mating shaft to be inserted into inner race 18 at a shaft insertion axial end 38 thereof. Primary annular chip groove 24 is also defined by a further edge 27 formed at the end of a pilot portion 36. Primary chip groove 24, which has a greater diameter that pilot portion 36, is axially between pilot portion 36 and first splined portion 32 such that an end of the shaft contacts primary cutting edge 26 before entering into first splined portion 32.

Figure 2C:
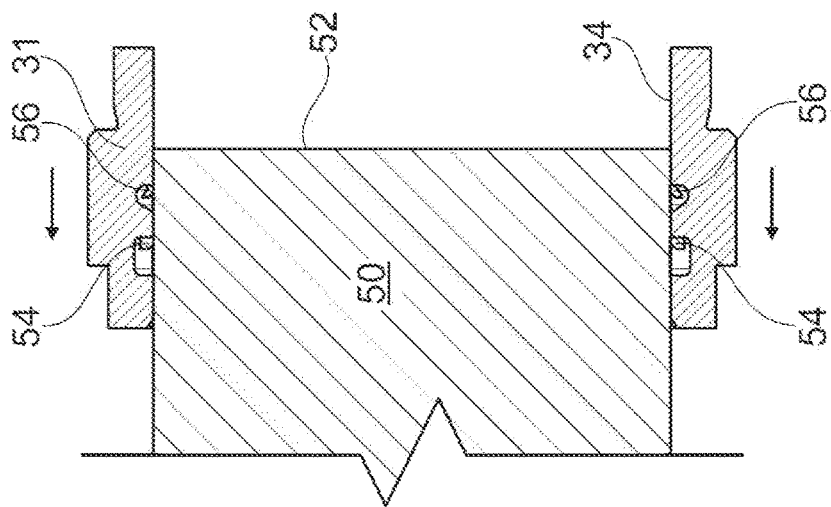
FIGS. 2a to 2c show a method of inserting a shaft into an inner race of the bearing assembly.
Figure 2B:
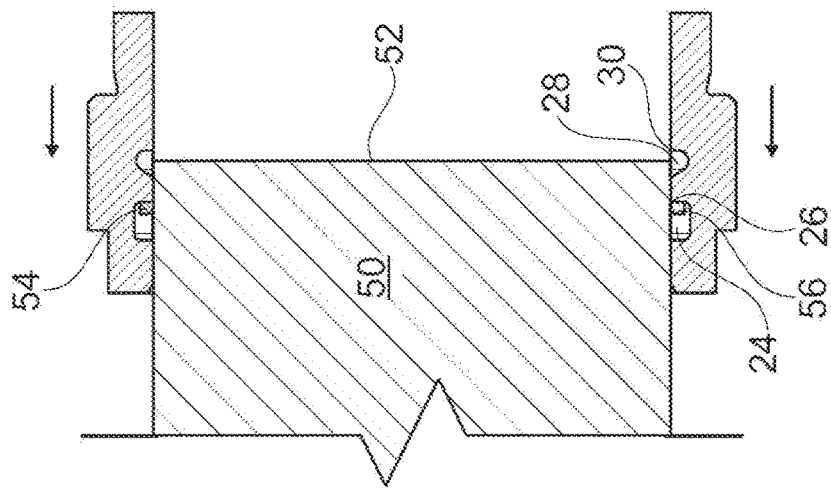
Figure 2A:
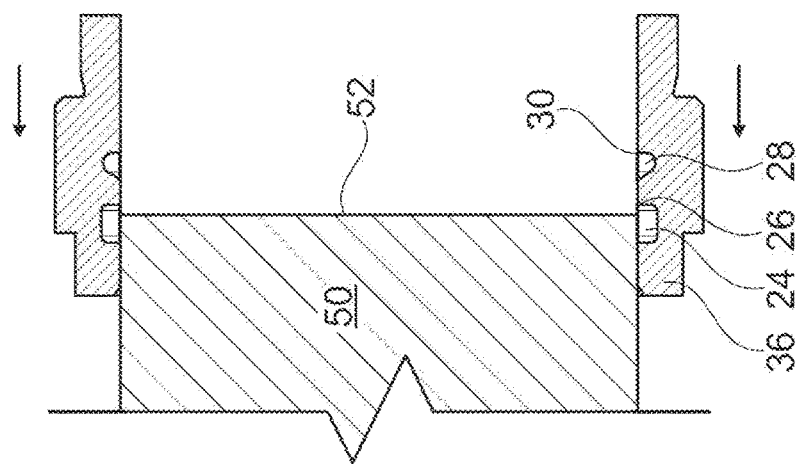

FIGS. 2a to 2c show schematic cross-sectional side view of a method of inserting a mating shaft 50 into inner race 18. In this embodiment, the inserting involves axially moving inner race 18, along with the other parts of bearing assembly 10, which are omitted for clarity, onto mating shaft 50, which is stationary. Other embodiments may involve axially moving mating shaft 50 while inner race 18 is stationary, or axially moving both shaft 50 and inner race 18. Accordingly, the inserting of the mating shaft 50 into inner race 18 may include axially moving mating shaft 50, axially moving inner race 18 or axially moving both mating shaft 50 and inner race 18.

FIG. 2a shows mating shaft 50 in the process of being inserted inside inner race 18. Inner race 18 has been slid onto mating shaft 50 such that a portion of shaft 50 is inside the pilot portion 36 and a leading axial end 52 of shaft 50 is aligned with primary chip groove 24. Accordingly, radially inner surface 20 of inner race 18 is not yet spline cutting shaft 50.

FIG. 2b shows mating shaft 50 further in the insertion process than in FIG. 2a. Inner race 18 has been further slid onto mating shaft 50 such that leading axial end 52 and a portion adjacent to axial end 52 have been spline cut by primary spline cutting edge 26. As a result of the spline cutting by edge 26, a displaced material 54 of the outer radial surface of mating shaft 50 (i.e., chip) has been displaced by primary spline cutting edge 26 into primary annular chip groove 24. Leading axial end 52 of shaft 50 is aligned with secondary chip groove 28. Accordingly, secondary spline cutting edge 30 is not yet spline cutting shaft 50.

Figure 3:
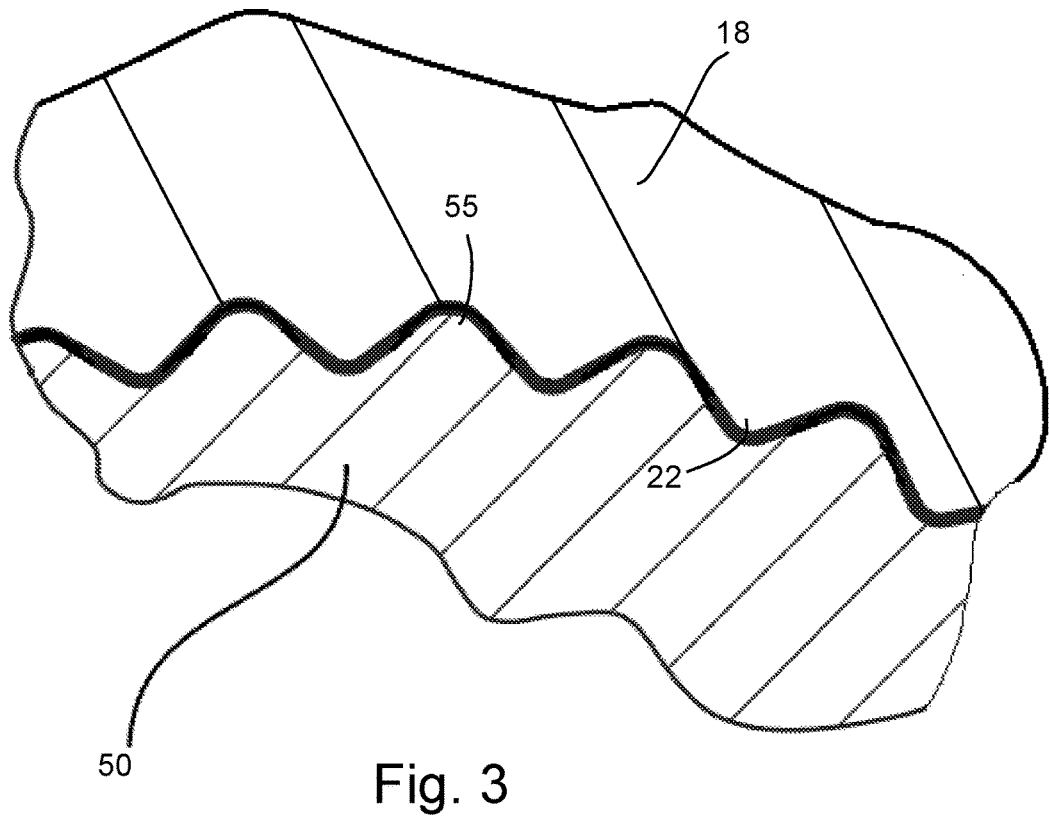
FIG. 3 illustrates a portion of a cross-section of the inner race and the mating shaft showing axially extending splines of the mating shaft mating with the axially aligned splines of the inner race.

FIG. 2c shows mating shaft 50 further in the insertion process than in FIG. 2b. Inner race 18 has been further slid onto mating shaft 50 such that leading axial end 52 and a portion adjacent to axial end 52 have been spline cut by secondary spline cutting edge 30. As a result of the spline cutting by edge 30, a displaced material 56 of the outer radial surface of mating shaft 50 (i.e., chip) has been displaced by secondary spline cutting edge 30 into secondary annular chip groove 28. Leading axial end 52 of shaft 50 is aligned with thick axial region 31 and second splined portion 34. Accordingly, upon completion of the spline cutting, when splined connection between inner race 18 and mating shaft 50 is completed and inner race 18 and mating shaft 50 together for a rotatable component, inner race 18 includes displaced material 54, 56 in both chip grooves 24, 28. When the splined connection is completed, as schematically shown in FIG. 3, the outer radial surface of mating shaft 50 includes axially aligned splines 55 that mate with axially aligned splines 22 of inner race 18.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A bearing assembly for a motor vehicle drive train comprising:
    rolling elements;
    an outer race supporting the rolling elements; and
    an inner race rotatably supported by the rolling elements, the inner race including a radially inner surface including a plurality of axially extending splines, the radially inner surface including a primary chip groove formed therein, the primary chip groove being defined by a primary cutting edge for spline cutting a mating shaft inserted into the radially inner surface, the radially inner surface further including a secondary chip groove formed therein axially offset from the primary chip groove, the secondary chip groove being defined by a second cutting edge for spline cutting the mating shaft inserted into the radially inner surface, the radially inner surface including a first splined portion axially between the primary chip groove and the secondary chip groove on a first axial side of the secondary chip groove and a second splined portion on a second axial side of the secondary chip groove opposite the first axial side, the first cutting edge being configured to cut second axially extending splines into the mating shaft, the second cutting edge being configured to clean up material that is formed into a major diameter of the second axially extending splines by the cutting of the second axially extending splines.

2. The bearing assembly as recited in claim 1 wherein the radially inner surface includes a pilot portion having a greater innermost diameter than the first splined portion, the primary chip groove being axially between the pilot portion and the first splined portion.

3. The bearing assembly as recited in claim 1 wherein the rolling elements include a first set of rolling elements and a second set of rolling elements axially offset from the first set of rolling elements.

4. The bearing assembly as recited in claim 3 wherein the inner race includes a first radially outer surface portion for supporting the first set of rolling elements and a second radially outer surface portion for supporting the second set of rolling elements, the first radially outer surface portion having a greater diameter than the second radially outer surface portion.

5. The bearing assembly as recited in claim 4 wherein the first radially outer surface portion forms a one-way clutch bearing surface and the second radially outer surface portion forms a needle bearing surface.

6. The bearing assembly as recited in claim 1 wherein the first splined portion and the second splined portion have a same inner diameter and a same spline alignment as each other.

7. The bearing assembly as recited in claim 1 wherein the primary cutting edge is perpendicular to a center axis of the bearing assembly.

8. A rotatable component for a motor vehicle drive train comprising:
    a hollow shaft including a radially inner surface including a plurality of first axially extending splines, the radially inner surface including a primary chip groove formed therein, the primary chip groove being defined by a primary cutting edge, the radially inner surface further including a secondary chip groove formed therein axially offset from the primary chip groove, the secondary chip groove being defined by a second cutting edge, the radially inner surface including a first splined portion axially between the primary chip groove and the secondary chip groove on a first axial side of the secondary chip groove and a second splined portion on a second axial side of the secondary chip groove opposite the first axial side, the first cutting edge being configured to cut second axially extending splines into a mating shaft inserted into the hollow shaft, the second cutting edge being configured to clean up material that is formed into a major diameter of the second axially extending splines by the cutting of the second axially extending splines.

9. The rotatable component as recited in claim 8 further comprising the mating shaft, the mating shaft having a radially outer surface held by the radially inner surface of the hollow shaft, the second axially extending splines mating with the first axially extending splines.

10. The rotatable component as recited in claim 9 wherein the mating shaft includes a first portion of displaced material radially extending from the radially outer surface into the primary chip groove.

11. The rotatable component as recited in claim 10 wherein the mating shaft includes a second portion of displaced material radially extending from the radially outer surface into the secondary chip groove.

12. The rotatable component as recited in claim 8 wherein the first splined portion and the second splined portion have a same inner diameter and a same spline alignment as each other.

13. The rotatable component as recited in claim 8 wherein the radially inner surface includes a pilot portion having a greater innermost diameter than the first splined portion, the primary chip groove being axially between the pilot portion and the first splined portion.

14. A method of forming a bearing assembly for a motor vehicle drive train comprising:
providing an inner race including a radially inner surface including a plurality of axially extending splines;
forming a primary annular chip groove in the radially inner surface defined by a primary cutting edge;
forming a secondary annular chip groove in the radially inner surface defined by a secondary cutting edge, the secondary chip groove being axially offset from the primary chip groove, the radially inner surface including a first splined portion axially between the primary chip groove and the secondary chip groove on a first axial side of the secondary chip groove and a second splined portion on a second axial side of the secondary chip groove opposite the first axial side, the first cutting edge being configured to cut second axially extending splines into a mating shaft, the second cutting edge being configured to clean up material that is formed into a major diameter of the second axially extending splines by the cutting of the second axially extending splines; and
providing the inner race radially inside of rolling elements.

15. The method as recited in claim 14 further comprising providing the rolling elements radially inside of an outer race.

16. The method as recited in claim 14 further comprising spline cutting a radially outer surface of the mating shaft using the axially extending splines by inserting the shaft into the inner race such that an end of the shaft slides along the primary cutting edge and then the secondary cutting edge.

17. The method as recited in claim 16 wherein the spline cutting includes displacing a first portion of material from the radially outer surface into the primary annular chip groove and displacing a second portion of material from the radially outer surface into the secondary annular chip groove.

18. The method as recited in claim 17 wherein the spline cutting includes sliding the end of the shaft along the first splined portion and then sliding the end of the shaft along the second splined portion so the secondary cutting edge cleans up material that is formed into the major diameter of the second axially extending splines by the cutting of the second axially extending splines.

19. The method as recited in claim 18 wherein the radially inner surface includes a pilot portion having a greater innermost diameter than the first splined portion, the primary chip groove being axially between the pilot portion and the first splined portion, the spline cutting includes sliding the end of the shaft through the pilot portion before sliding the end of the shaft along the first splined portion.

20. The method as recited in claim 14 further comprising forming the first splined portion and the second splined portion to have a same inner diameter and a same spline alignment as each other.

* * * * *